United States Patent
Lee et al.

(10) Patent No.: US 11,692,123 B2
(45) Date of Patent: Jul. 4, 2023

(54) METHOD OF CONSOLIDATING SUBTERRANEAN FORMATIONS USING CATIONIC AND ANIONIC AND/OR NON-IONIC POLYMERS

(71) Applicant: Petroliam Nasional Berhad (Petronas), Kuala Lumpur (MY)

(72) Inventors: Rui Yan Lee, London (GB); Paul F. Luckham, London (GB); Omar K. Matar, London (GB)

(73) Assignee: Petroliam Nasional Berhad (Petronas), Kuala Lumpur (MY)

(*) Notice: Subject to any disclaimer, the term of this patent is extended or adjusted under 35 U.S.C. 154(b) by 0 days.

(21) Appl. No.: 16/500,905

(22) PCT Filed: Apr. 5, 2018

(86) PCT No.: PCT/MY2018/050015
§ 371 (c)(1),
(2) Date: Oct. 4, 2019

(87) PCT Pub. No.: WO2018/186733
PCT Pub. Date: Oct. 11, 2018

(65) Prior Publication Data
US 2020/0131430 A1    Apr. 30, 2020

(30) Foreign Application Priority Data
Apr. 6, 2017    (GB) ..................................... 1705558

(51) Int. Cl.
*C09K 8/57*    (2006.01)
*C09K 8/575*    (2006.01)
(Continued)

(52) U.S. Cl.
CPC ...... *C09K 8/5753* (2013.01); *C08F 220/1802* (2020.02); *C08F 220/56* (2013.01); *C08F 226/02* (2013.01)

(58) Field of Classification Search
CPC ........................... C09K 8/5753; C08F 220/56
(Continued)

(56) References Cited

U.S. PATENT DOCUMENTS 4,447,342 A    5/1984    Borchardt et al.
4,574,885 A *  3/1986    Horton .................. C09K 8/608
                                                              166/270.1
(Continued)

FOREIGN PATENT DOCUMENTS

EP      2 218 761 A1    8/2010
WO      WO 2015/020640 A1    2/2015
(Continued)

OTHER PUBLICATIONS

Brown, L. R. et al., *Augmenting a Microbial Selective Plugging Technique With Polymer Flooding to Increase the Efficiency of Oil Recovery—A Search for Synergy*, Third Semi-Annual Progress Report, Mississippi State University (Dec. 2000) 21 pages.
(Continued)

*Primary Examiner* — William D Hutton, Jr.
*Assistant Examiner* — Ashish K Varma
(74) *Attorney, Agent, or Firm* — Alston & Bird LLP (57) ABSTRACT

A method of consolidating a subterranean formation which comprises particles is provided. The method includes selecting a subterranean formation in need of consolidation, contacting the particles with a cationic polymer and then an anionic or non-ionic polymer, thereby agglomerating the particles and consolidating the formation, wherein the agglomeration increases the uniformity of the size of the particles. Methods of producing hydrocarbon wherein the
(Continued)

formation is consolidated by the method herein described are also provided. Use of kits comprising cationic polymer and anionic polymer and/or non-ionic polymer to consolidate subterranean formations is further provided. Kits comprising the polymers used in the method are also provided.

20 Claims, 4 Drawing Sheets

(51) Int. Cl.
 *C08F 220/18* (2006.01)
 *C08F 220/56* (2006.01)
 *C08F 226/02* (2006.01)
(58) Field of Classification Search
 USPC .......................................................... 166/295
 See application file for complete search history.

(56) References Cited

U.S. PATENT DOCUMENTS

| | | | |
|---|---|---|---|
| 4,617,132 A * | 10/1986 | Dalrymple | C09K 8/501 166/294 |
| 6,474,413 B1 | 11/2002 | Barbosa et al. | |
| 7,392,847 B2 | 7/2008 | Gatlin et al. | |
| 8,076,271 B2 | 12/2011 | Blauch et al. | |
| 8,263,533 B2 | 9/2012 | Tabary et al. | |
| 8,680,028 B2 | 3/2014 | Braun et al. | |
| 9,644,139 B2 * | 5/2017 | Mahoney | C09K 8/62 |
| 2007/0062697 A1 * | 3/2007 | Barbosa | C09K 8/501 166/263 |
| 2009/0065162 A1 | 3/2009 | Cheng et al. | |
| 2014/0051610 A1 * | 2/2014 | Perry | C09K 8/845 507/226 |
| 2015/0068747 A1 | 3/2015 | Hwang et al. | |

FOREIGN PATENT DOCUMENTS

| | | |
|---|---|---|
| WO | WO 2015/038122 A1 | 3/2015 |
| WO | WO 2015/076693 A1 | 5/2015 |
| WO | WO 2016/053327 A1 | 4/2016 |

OTHER PUBLICATIONS

Oyeghile, B. et al., *Optimization of Physiochemical Process for Pre-Treatment of Fine Suspension by Flocculation Prior to Dewatering*, Desalination and Water Treatment, vol. 57, Issue 6 (International Congress on Water, Waste and Energy Management) (2015) 12 pages.
S12A-003—Appendix 8 MSDS (Aug. 1, 2012) 451 pages.
International Search Report and Written Opinion for Application No. PCT/MY2018/050015 dated Jun. 5, 2018, 9 pages.

* cited by examiner

METHOD OF CONSOLIDATING SUBTERRANEAN FORMATIONS USING CATIONIC AND ANIONIC AND/OR NON-IONIC POLYMERS

CROSS-REFERENCE TO RELATED APPLICATIONS

The present application is a national phase entry of PCT/MY2018/050015, filed on Apr. 5, 2018, which claims the benefit of priority of United Kingdom Patent Application No. 1705558.3, filed Apr. 6, 2017, the entire contents of which are hereby incorporated by reference in their entirety for all purposes.

TECHNICAL FIELD

The present invention provides a method of consolidating a subterranean formation which comprises particles (e.g. sand particles of a sandstone formation), comprising selecting a subterranean formation in need of consolidation, contacting the particles with a cationic polymer and then an anionic or non-ionic polymer, thereby agglomerating the particles and consolidating the formation, wherein the agglomeration increases the uniformity of the size of the particles. The invention also relates to methods of producing hydrocarbon wherein the formation is consolidated by the method herein described as well as to use of kits comprising cationic polymer and anionic polymer and/or non-ionic polymer to consolidate subterranean formations. The invention also relates to certain kits comprising the polymers used in the method of the invention.

BACKGROUND

Hydrocarbons (i.e. oil or gas) are recovered from subterranean formations by drilling a well bore into the formation and extracting the hydrocarbon. One of the key factors that impacts on the rate of hydrocarbon production is the permeability of the formation. The permeability of the formation, in turn, depends on the size of its pores and internal capillaries.

Subterranean formations typically comprise particles that are closely packed together. For example, sandstone formations typically comprise sand particles that are closely packed together. These close packed particles form the basic framework or structure of the formation. The matrix strength of the particles is different in different formations but in poorly consolidated or unconsolidated formations is not high. This manifests in particles readily breaking off from the formation during hydrocarbon production. This is a problem, for example, in sandstone formations where sand particles break off. Subterranean formations also comprise many smaller particulates (so-called "fines"). For example sandstone formations comprise "fines" which may comprise sand and other materials (e.g. quartz or clays). Typically the fines are present in the pores or interstitial spaces formed by the close packing of particles.

During hydrocarbon recovery from subterranean formations, there is a risk that both particles and fines are produced along with hydrocarbon. When a large volume of fluid is forced to flow through a formation, and especially a poorly consolidated or unconsolidated formation, both the particles comprising the structure of the formation and the fines may be transported to the surface. This is referred to as particle production. In sandstone formations this is referred to as sand production. The disposal of large volumes of particles produced from unconsolidated or poorly consolidated formations is costly and, in some cases, is difficult to carry out for logistical reasons.

Moveable fines present in a formation can also become lodged in capillaries or a pore throat (i.e. the smaller interstices between the particles of the formation). This may plug the pore spaces thereby causing a reduction in permeability of the formation and hence a subsequent reduction in the rate of hydrocarbon (e.g. oil) production. Permeability impairment due to the production and movement of fines is a major problem in the operation of hydrocarbon-producing wells, particularly those located within poorly or unconsolidated formations. The result is usually lost production.

A number of methods for controlling particle production are used. For example, methods for controlling sand production include mechanical techniques such as well screens and gravel packing as well as chemical treatments (chemical sand consolidation) and combinations of these methods. Chemical treatments which have been proposed for sand consolidation include application of furaldehydes, phenols and epoxy based systems. A drawback to these treatments, however, is that they have a tendency to block the pores of the formation thereby reducing its permeability to both oil and water. This may result in a reduction in the production rate.

More recently WO2015/020640 disclosed a method for treating a subterranean formation comprising contacting the formation with a cationic polymer and water. A range of different cationic polymers are described including polydiallyldimethylammonium chloride (polyDADMAC). The treatment with the cationic polymer is said to agglomerate subterranean particles, to decrease the amount of small-sized particles and reduce particle migration downhole.

EP2218761 discloses a method for treating a subterranean formation comprising preparing a composition comprising a micro- or nano-particle system of polycation/polyanion complexes, and injecting the composition into the formation.

SUMMARY OF INVENTION

According to a first aspect, the present invention provides a method of consolidating a subterranean formation which comprises particles, preferably sand particles, said method comprising:
(i) selecting a subterranean formation in need of consolidation;
(ii) contacting said particles with a cationic polymer; and then
(iii) contacting said particles with an anionic polymer and/or a non-ionic polymer to agglomerate said particles and thereby consolidate said formation, wherein said agglomeration increases the uniformity of the size of said particles.

According to a further aspect, the present invention provides a method of producing hydrocarbon from an unconsolidated subterranean formation comprising:
(i) consolidating said formation by a method as hereinbefore defined; and
(ii) producing hydrocarbon from said formation.

According to a further aspect, the present invention provides use of a kit comprising:
a cationic polymer in a first container; and
an anionic polymer and/or a non-ionic polymer in a second container;
to consolidate a subterranean formation comprising particles, preferably sand particles.

According to a further aspect, the present invention provides a kit comprising:
a cationic polymer in a first container; and
an anionic polymer and/or a non-ionic polymer in a second container.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Definitions

As used herein the term "hydrocarbon producing system" refers to a subterranean formation (e.g. rock) from which hydrocarbon is extracted as well as the equipment used in the extraction process.

As used herein the term "subterranean formation" refers to rock which exists below the earth's surface. The formation may lie below land or water.

As used herein the term "particles" encompasses the particles which form the framework or structure of the subterranean formation as well as the fines which are usually present within the structure. The terms "fines", "fine particulates" and "particulate fines" are all used to describe particles having a mean diameter of <50 μm and which tend to be present in the pores or interstitial spaces formed by the relatively larger particles forming the structure of the formation. Usually the "fines" are small enough to pass through the openings present in screens used during well production. Preferred particles are sand particles.

As used herein the term "particle size" refers to the average particle diameter.

As used herein the term "average diameter" refers to the mean diameter of particles. Since the particles present in formations are only roughly spherical, the "diameter" is used to refer to the longest dimension across a cross section of a particle. The diameter of particles may be measured by different techniques, e.g. by using a Focused Beam Reflectance Measurement (FBRM) probe.

As used herein the term "consolidating" refers to the process of increasing the ability of the particles to hold together within the formation or a hydrocarbon producing system. An increase in the consolidation of a formation may, for example, manifest in a reduction in the particle production rate during hydrocarbon production from the formation because more particles and fines are held in the formation and thus fewer particles, e.g. sand particles, and fines are produced along with hydrocarbon.

As used herein the term "to agglomerate" refers to the process by which particles gather, cluster or collect together to form a larger mass. The term "agglomerate" refers to the mass formed.

As used herein the Uniformity coefficient, Uc, is defined as $D_{40}/D_{90}$ wherein $D_{40}$ is the particle size at the 40% cumulative level from the sieve analysis plot (i.e. the diameter at which 40% of the mass is retained in a sieve analysis), wherein the x axis is plotted from large to small values, and $D_{90}$ is the particle size at the 90% cumulative level from the sieve analysis plot (i.e. the diameter at which 90% of the mass is retained in a sieve analysis). If Uc is less than 3, the particles are considered to be uniform. If Uc is 3 to 5, the particles are considered non-uniform and if Uc is greater than 5 the particles are considered highly non-uniform. Thus agglomeration is characterised by a decrease in the value of Uc since the amount of smaller particles is reduced.

As used herein the term "cationic polymer" refers to a polymer carrying a net positive charge.

As used herein the term "anionic polymer" refers to a polymer carrying a net negative charge.

As used herein the term "non-ionic polymer" refers to a polymer carrying no net charge.

As used herein the term "copolymer" refers to a polymer made from two or more (e.g. 2) different monomers. Typically copolymers for use in the invention will comprise at least 5% wt of each monomer relative to the total weight of monomers.

As used herein the phrase "(co)polymer formed from" refers to a monomer unit present in the composition of a (co)polymer. Other monomer units may additionally be present.

DETAILED DESCRIPTION OF THE INVENTION

The present invention relates to a method of consolidating a subterranean formation which comprises particles, wherein the method comprises:
(i) contacting the particles with a cationic polymer; and
(ii) contacting the particles with an anionic polymer and/or a non-ionic polymer to agglomerate said particles and thereby consolidate said formation.

The method may be employed to stabilise any poorly consolidated or unconsolidated subterranean formation. Thus the method of the invention comprises the further step of selecting a subterranean formation in need of consolidation.

Poorly consolidated and unconsolidated subterranean formations often comprise, in addition to particles, a broad range of "fines". These fines may, for example, comprise siliceous materials such as quartz, as well as water-swellable clays and non-water-swellable clays. Subterranean formations comprising particles and/or comprising fines that comprise silica are particularly suitable for application of the method of the invention. The method of the invention is particularly suitable for use in subterranean formations comprising mainly sand in sandstone formations comprising sand particles.

In the method of the present invention, consolidation is achieved by agglomerating particles and/or fines. Critically the agglomerates formed are stable in production conditions and thus to do not break up during production following treatment. The agglomeration achieved in the method of the present invention preferably increases the average diameter of the particles present in the formation. This is because the agglomeration clusters or gathers together particles and fines into larger masses. Preferably the agglomeration increases the average diameter of particles present in the formation by 200-2000%, more preferably 300-1000% and still more preferably 400-800%. Preferably the average diameter of particles present in the formation after agglomeration by the method of the invention is 250-2500 µm, more preferably 350-1000 µm and still more preferably 450-800 µm. Since the agglomerates formed are preferably >250 µm in size, they will be trapped or caught by conventional particle screens during subsequent hydrocarbon production from the well. As a result, particle production is decreased.

The agglomeration achieved in the method of the invention increases the uniformity of the particles present in the subterranean formation. The Uc of particles present in an unconsolidated formation prior to treatment by the method of the invention is typically >20. After treatment by the method of the invention, the particles present in the formation preferably have a Uc of 1-20, more preferably 1-10 and still more preferably 1-5.

In preferred methods of the invention, the cationic polymer is a copolymer. Preferred copolymers for use as the cationic polymer comprise two or three different monomers and preferably two different monomers.

In preferred methods of the invention the cationic polymer is formed from monomers of formula (I):

(I)

wherein $R^1$ is H or $CH_3$; and $R^2$ is COY, $C_{6-12}$ aryl or $C_{3-12}$ heteroaryl;

Y is OR or $NR_2$; and each R is independently selected from H and $C_{1-6}$ alkyl.

In some preferred methods of the invention, the cationic polymer is formed from monomers of formula (II)

(II)

wherein $R^1$ is H or $CH_3$; and A is $C_{3-12}$ heteroaryl group.

Preferred heteroaryl groups comprise one or two nitrogen atoms. Representative examples of suitable heteroaryl groups include pyridine and imidazole.

In some preferred methods of the invention, the cationic polymer is formed from monomers of formula (III)

(III)

wherein $R^1$ is H or $CH_3$; and

Y is OR or $NR_2$; wherein each R is independently selected from H and $C_{1-6}$ alkyl.

When R is $C_{1-6}$ alkyl, it is preferably methyl or ethyl, and more preferably methyl. Preferably, however, R is H.

More preferably when Y is OR, R is $C_{1-6}$ alkyl.

Still more preferably Y is $NR_2$ and each R is H, i.e. the monomer is acrylamide.

In preferred methods of the invention, the cationic polymer comprises 5 to 95% wt monomer of formula (II) or (III), more preferably 10 to 90% wt monomer of formula (II) or (III) and still more preferably 15 to 85% wt monomer of formula (II) or (III).

In preferred methods of the invention, the cationic polymer is formed from monomers based on amino or quaternary ammonium substituted acrylamide, acrylic, vinyl or allyl. When the substituting group present is amino, it becomes positively charged in situ. Thus preferred cationic polymers are formed from monomers selected from (i)-(iv) shown below:

(i)

(ii)

(iii)

(iv)

Preferred cationic polymers are formed from monomers based on amino or quaternary ammonium substituted acrylamide or acrylic.

Further preferred cationic polymers are formed from monomers based on amino or quaternary ammonium substituted acrylamide, acrylic, vinyl or allyl wherein a polysaccharide linker is present. Thus other preferred cationic polymers are formed from monomers (v) wherein n is an integer from 1 to 10:

(v)

Particularly preferred monomers of formula (v) present in the cationic polymer are of formula (vi) wherein n is an integer from 1 to 10:

(vi)

Particularly preferred monomers present in the cationic polymer are monomers of formula (IV):

(IVa)

(IVb)

wherein $R^1$ is H or $CH_3$;
$Y^1$ is O or NH;
m is an integer from 1 to 6;
each $R^2$ is independently H or $C_{1-6}$ alkyl; and
$X^-$ is a counter anion (e.g. $Cl^-$).

In preferred monomers of formula (IV), $R^1$ is H. In preferred monomers of formula (IV), m is 2 or 3. In further preferred monomers of formula (IV), each $R^2$ is the same. Preferably each $R^2$ is $C_{1-6}$ alkyl and more preferably $C_1$, $C_2$ or $C_3$ alkyl. Still more preferably each $R^2$ is methyl.

In some preferred monomers of formula (IV), m is 2 and each $R^2$ is methyl. In other preferred monomers of formula (IV), m is 3 and each $R^2$ is methyl.

In preferred methods of the invention the cationic polymer is formed from monomers shown in the table below:

| Monomer name | Monomer structure |
| --- | --- |
| 2-(trimethylammonio)ethyl acrylate salt, | |
| 2-(trimethylammonio)ethyl methacrylate salt | |

-continued

| Monomer name | Monomer structure |
|---|---|
| 2-(triethylammonio)ethyl acrylate salt | Structure: acrylate with -O-CH$_2$CH$_2$-N$^+$(Et)$_3$ X$^-$ |
| 2-(triethylammonio)ethyl methacrylate salt | Structure: methacrylate with -O-CH$_2$CH$_2$-N$^+$(Et)$_3$ X$^-$ |
| acrylamide propyltrimethylammonium salt | Structure: acrylamide with -NH-CH$_2$CH$_2$CH$_2$-N$^+$Me$_3$ X$^-$ |
| methacrylamide propyltrimethylammonium salt | Structure: methacrylamide with -NH-CH$_2$CH$_2$CH$_2$-N$^+$Me$_3$ X$^-$ |
| acrylamide propyltriethylammonium salt | Structure: acrylamide with -NH-CH$_2$CH$_2$CH$_2$-N$^+$Et$_3$ X$^-$ |
| methacrylamide propyltriethylammonium salt | Structure: methacrylamide with -NH-CH$_2$CH$_2$CH$_2$-N$^+$Et$_3$ X$^-$ |

-continued

| Monomer name | Monomer structure |
|---|---|
| diallyldimethyl ammonium salt |  |
| 2-vinylpyridine |  |
| 4-vinylpyridine |  |
| 3-methyl-1-vinyl-1H-imidazole salt |  |
| cationic guar |  |

Particularly preferably the cationic polymer is formed from monomers selected from 2-(trimethylammonio)ethyl acrylate salt, 2-(trimethylammonio)ethyl methacrylate salt, 2-(triethylammonio)ethyl acrylate salt, 2-(triethylammonio) ethyl methacrylate salt, acrylamide propyltrimethylammonium salt, methacrylamide propyltrimethylammonium salt, acrylamide propyltriethylammonium salt, methacrylamide propyltriethylammonium salt, 2-vinylpyridine salt, 4-vinylpyridine salt and 3-methyl-1-vinyl-1H-imidazole salt. Still more preferably the cationic polymer is formed from monomers selected from 2-(trimethylammonio)ethyl acrylate salt, 2-(trimethylammonio)ethyl methacrylate salt, 2-(triethylammonio)ethyl acrylate salt and 2-(triethylammonio)ethyl methacrylate salt. Yet more preferably the cationic polymer is formed from monomers selected from 2-(trimethylammonio)ethyl acrylate salt and 2-(trimethylammonio)ethyl methacrylate salt, and especially 2-(trimethylammonio)ethyl acrylate salt.

In preferred methods of the invention, the cationic polymer comprises 5 to 95% wt monomer of formula (IV), more preferably 10 to 90% wt monomer of formula (IV) and still more preferably 15 to 85% wt monomer of formula (IV).

In preferred methods of the invention, the cationic polymer comprises 5 to 95% wt monomer of formula (III) and 5-95% wt monomer of formula (IV), more preferably 10 to 90% wt monomer of formula (III) and 10-90% wt monomer of formula (IV) and still more preferably 15 to 85% wt monomer of formula (I) and 15-85% wt monomer of formula (IV).

Preferred cationic polymers for use in the present invention may comprise one or more (e.g. 1 or 2) different monomers of formula (III). Preferably, however, the copolymer comprises one type of monomer of formula (III).

Preferred cationic polymers for use in the present invention may comprise one or more (e.g. 1 or 2) different monomers of formula (IV). Preferably, however, the copolymer comprises one type of monomer of formula (IV). Particularly preferably the copolymer comprises one type of monomer of formula (III) and one type of monomer of formula (IV).

A preferred cationic polymer for use in the method of the present invention comprises acrylamide and 2-(trimethylammonio)ethyl acrylate salt. Suitable cationic copolymers are commercially available.

Particularly preferred cationic polymers for use in the invention comprise repeat units of formula (V):

wherein
each R is independently selected from H and $C_{1-6}$ alkyl;
$R^1$ is H or $CH_3$;
$Y^1$ is O or NH;
m is an integer from 1 to 6;
each $R^2$ is independently selected from H and $C_{1-6}$ alkyl;
$X^-$ is a counter ion;
a is integer between 5000 and 500,000; and
b is an integer between 1000 and 100,000.

Preferred values for R, $R^1$, $R^2$, $Y^1$ and m are as set out above in relation to formulae (III) and (IV).

Preferably a is an integer between 1,000 and 200,000.
Preferably b is an integer between 2,000 and 50,000.
Preferably the cationic polymer has a weight average molecular weight of $1\times10^5$ to $40\times10^6$ g/mol, more preferably $1\times10^6$ to $15\times10^6$ g/mol and still more preferably $2.5\times10^6$ to $12\times10^6$ g/mol.

Preferably the cationic polymer has a charge activity of 5 to 100 mol %, more preferably 5 to 40 mol %, still more preferably 10 to 30 mol % and more preferably still 10 to 20 mol %.

Preferred cationic polymers for use in the methods of the invention are random copolymers. Further preferred cationic polymers for use in the methods of the invention are substantially linear.

In preferred methods of the invention, the anionic polymer is a copolymer. Preferred copolymers for use as the anionic polymer comprise two or three different monomers and preferably two different monomers.

In preferred methods of the invention the anionic polymer is formed from monomers of formula (III):

wherein
$R^1$ is H or $CH_3$; and
Y is OR or $NR_2$; wherein each R is independently selected from H and $C_{1-6}$ alkyl.

When R is $C_{1-6}$ alkyl, it is preferably methyl or ethyl, and more preferably methyl. Preferably, however, R is H.

More preferably when Y is OR, R is $C_{1-6}$ alkyl.

Still more preferably Y is $NR_2$ and each R is H, i.e. the monomer is acrylamide.

In preferred methods of the invention, the anionic polymer and the cationic polymer comprise the same monomer of formula (III).

In preferred methods of the invention, the anionic polymer comprises 10 to 95% wt monomer of formula (III), more preferably 40 to 85% wt monomer of formula (III) and still more preferably 60 to 80% wt monomer of formula (III).

In preferred methods of the invention, the anionic polymer is formed from monomers based on substituted acrylamide, substituted acrylic, substituted vinyl or substituted allyl, wherein said substituent is selected from carboxylic acid, sulfonic add and phosphoric acid. Thus preferred anionic polymers are formed from monomers selected from (vii)-(x) shown below;

Preferred anionic polymers are formed from monomers based on substituted acrylamide and/or substituted acrylic monomers, wherein said substituent is selected from carboxylic acid, sulfonic acid and phosphoric acid.

Particularly preferred monomers present in the anionic polymers are of (VI):

wherein
R¹ is H or CH₃; and
R³ is an anionic group, such as $CO_2Z$, $SO_3Z$, $PO_3Z_2$, $(CH_2)_{1-6}CO_2Z$, $(CH_2)_{1-6}SO_3Z$, $(CH_2)_{1-6}PO_3Z_2$, $CONH(CR)_2CO_2Z$, $CONH(CR)_2SO_3Z$, $CONH(CR)_2PO_3Z_2$, wherein R is H, CH₃ or C₂H₅ and Z is H or a univalent metal atom.

In preferred monomers of formula (VI), R¹ is H. In further preferred monomers of formula (VI), R³ is $CO_2Z$, $(CH_2)_{1-6}CO_2Z$ or $CONH(CR)_2CO_2Z$, wherein R is H, CH₃ or C₂H₅ and Z is H or a univalent metal atom. More preferably R³ is $CO_2Z$ or $(CH_2)_{1-6}CO_2Z$, wherein Z is H or a univalent metal atom. Particularly preferably R³ is $CO_2Z$, wherein Z is H or a univalent metal atom.

In preferred methods of the invention the anionic polymer is formed from monomers shown in the table below:

| Monomer name | Monomer structure |
|---|---|
| acrylic acid |  |
| methacrylic acid |  |
| vinyl sulfonic acid |  |
| vinyl phosphoric acid |  |
| 2-acrylamido 2-methylpropanesulfonic acid |  |

Particularly preferably the anionic polymer is formed from monomers selected from acrylic acid and methacrylic acid and particularly preferably from acrylic acid. Optionally polyacrylamide may be partially hydrolysed to form a polymer comprising carboxylic acid groups.

In preferred methods of the invention, the anionic polymer comprises 5 to 90% wt monomer of formula (VI), more preferably 15 to 60% wt monomer of formula (VI) and still more preferably 20 to 40% wt monomer of formula (VI).

In preferred methods of the invention, the anionic polymer comprises 10 to 95% wt monomer of formula (III) and 5-90% wt monomer of formula (VI), more preferably 40 to 85% wt monomer of formula (III) and 15-60% wt monomer of formula (VI) and still more preferably 60 to 80% wt monomer of formula (III) and 20-40% wt monomer of formula (VI).

Preferred anionic polymers for use in the present invention may comprise one or more (e.g. 1 or 2) different monomers of formula (III). Preferably, however, the copolymer comprises one type of monomer of formula (III).

Preferred anionic polymers for use in the present invention may comprise one or more (e.g. 1 or 2) different monomers of formula (VI). Preferably, however, the copolymer comprises one type of monomer of formula (VI).

Particularly preferably the copolymer comprises one type of monomer of formula (III) and one type of monomer of formula (VI).

A preferred anionic polymer for use in the method of the present invention comprises acrylamide and acrylic acid. Suitable anionic copolymers are commercially available.

Particularly preferred anionic polymers for use in the invention comprise repeat units of formula (VII):

(VII)

wherein
each R is independently selected from H and $C_{1-6}$ alkyl;
R¹ is H or CH₃;
R³ is $CO_2Z$, $SO_3Z$, $PO_3Z_2$, $(CH_2)_{1-6}CO_2Z$, $(CH_2)_{1-6}SO_3Z$, $(CH_2)_{1-6}PO_3Z_2$, $CONH(CR)_2CO_2Z$, $CONH(CR)_2SO_3Z$, $CONH(CR)_2PO_3Z_2$, wherein R is H, CH₃ or C₂H₅ and Z is H or a univalent metal atom;
a is integer between 5,000 and 500,000; and
b is an integer between 1,000 and 100,000.

Preferred values for R, R¹, R³ and Z are as set out above in relation to formula (III) and (V).

Preferably a is an integer between 10,000 and 200,000.
Preferably b is an integer between 2,000 and 50,000.

Preferably the anionic polymer has a weight average molecular weight of $1\times10^5$ to $40\times10^6$ g/mol, more preferably $10\times10^6$ to $35\times10^6$ g/mol and still more preferably $15\times10^6$ to $25\times10^6$ g/mol.

Preferably the anionic polymer has a charge activity of 10 to 100 mol %, more preferably 15 to 60 mol %, still more preferably 20 to 40 mol % and more preferably still 25 to 35 mol %.

Preferred anionic polymers for use in the methods of the invention are random copolymers. Further preferred anionic polymers for use in the methods of the invention are substantially linear.

The non-ionic polymer used in the methods of the invention may be uncharged or it may be charge neutral, i.e. it may have equal numbers of positive and negative charges. Preferably, however, the non-ionic polymer is uncharged. In preferred methods of the invention, the non-ionic polymer is a homopolymer.

In preferred methods of the invention the non-ionic polymer comprises monomers of formula (III):

(III)

wherein
R¹ is H or CH₃; and
Y is OR or NR₂;
wherein when Y is OR, R is independently selected from $C_{1-6}$ alkyl and when Y is NR₂
each R is independently selected from H and $C_{1-6}$ alkyl.

When R is $C_{1-6}$ alkyl, it is preferably methyl or ethyl, and more preferably methyl. Preferably, however, R is H.

More preferably when Y is OR, R is $C_{1-6}$ alkyl.

Still more preferably Y is $NR_2$ and each R is H, i.e. the monomer is acrylamide. Preferably the non-ionic polymer used in the method of the invention is polyacrylamide.

Preferably the non-ionic polymer has a weight average molecular weight of $1\times10^5$ to $40\times10^6$ g/mol, more preferably $10\times10^6$ to $35\times10^6$ g/mol and still more preferably $15\times10^6$ to $25\times10^6$ g/mol. Further preferred non-ionic polymers for use in the methods of the invention are substantially linear.

A preferred non-ionic polymer for use in the method of the present invention comprises acrylamide. Suitable polymers are commercially available.

Some preferred methods of the invention comprise (i) contacting the particles with a cationic polymer as hereinbefore described and then (ii) contacting the particles with an anionic polymer as hereinbefore described.

Other preferred methods of the invention, comprise (i) contacting the particles with a cationic polymer as herein before described and then (ii) contacting the particles with an non-ionic polymer as hereinbefore described.

In the methods of the present invention the cationic polymer and the anionic polymer and/or non-ionic polymer are added sequentially to the subterranean formation.

Without wishing to be bound by theory, it is believed that the method of the present invention combines multiple different agglomeration mechanisms to effectively agglomerate particles and thereby consolidate a subterranean formation. It is thought that the cationic polymer is attracted to the negatively charged particles and adsorbs to the surface of the particles. The adsorption of cationic polymer onto the surface of particles is believed to facilitate interaction between particles. First, because of the substantial length of the cationic polymer, the polymer is likely to bridge between particles, i.e. be attracted to more than one particle. Second, the adsorption of cationic polymer onto the surface of particles creates patches of positive charge and these attract the negative charge of other particles. Third, the cationic polymer neutralizes the negative charge of the particles which removes any electrical double layer repulsion. Thus a combination of these three mechanisms is believed to gather or cluster particles together.

The addition of the anionic and/or non-ionic polymer is, however, critical. Without the addition of the anionic and/or non-ionic polymer the agglomerate is easily broken up. It is believed that the anionic and/or non-ionic polymer is responsible for achieving stable agglomeration wherein clusters of particles are formed. The anionic and/or non-ionic polymer is believed to form an outer layer or layers on the cationic polymer adsorbed to the surface of the particles and to form bridges between particles and binds the aggregates together. The presence of the outer layer(s) significantly increases the matrix strength of the agglomerates and therefore their stability. As a result, the average diameter of particles present in the formation is increased and the uniformity of particle diameter sizes present in the formation is increased.

The polymers for use in the method (i.e. cationic polymer, anionic polymer and/or non-ionic polymer) of the invention are preferably each applied as a composition which is a solution or dispersion in a liquid carrier. When both anionic and non-ionic polymers are used, they may be provided in the same liquid carrier or may be provided separately. The liquid carrier may be aqueous or non-aqueous. Suitable non-aqueous carriers include alkanols. More preferably, however, the liquid carrier is aqueous. A preferred liquid carrier is brine or sea water.

The concentration of the cationic polymer in the composition will be an amount effective to achieve consolidation and will be readily determined by those skilled in the art. Typically, however, the cationic polymer will be present in the composition at a concentration of $10^{-5}$ to 1% wt, preferably $10^{-4}$ to 0.1% wt and more preferably $10^{-3}$ to 0.1% wt.

The concentration of the anionic polymer in the composition will be an amount effective to achieve consolidation and will be readily determined by those skilled in the art. Typically, however, the anionic polymer will be present in the composition at a concentration of $10^{-5}$ to 1% wt, preferably $10^{-4}$ to 0.1% wt and more preferably $10^{-3}$ to 0.1% wt.

The concentration of the non-ionic polymer in the composition will be an amount effective to achieve consolidation and will be readily determined by those skilled in the art. Typically, however, the non-ionic polymer will be present in the composition at a concentration of $10^{-5}$ to 1% wt, preferably $10^{-4}$ to 0.1% wt and more preferably $10^{-3}$ to 0.1% wt.

Each of the liquid carriers and/or composition may also contain other additives known in the art for use in subterranean formation treatment. Such additives include surfactants, thickeners, diversion agents, corrosion inhibitors, scale inhibitors, pH buffers, fracture fluids, proppants, and pH buffers. Particularly preferably, however, each liquid carrier and/or composition consists essentially of, and still more preferably consists of, one or more polymers as hereinbefore described.

Preferred cationic polymer present in the composition is as hereinbefore described in relation to the method. Preferred anionic polymer present in the composition is as hereinbefore described in relation to the method. Preferred non-ionic polymer present in the composition is as hereinbefore described in relation to the method. Preferred liquid carrier present in the composition is as hereinbefore described in relation to the method.

The concentration of the cationic polymer in the composition may be higher than that required to achieve consolidation as the polymer may be provided in concentrated form. Typically, however, the cationic polymer will be present in the composition at a concentration of $2\times10^{-5}$ to 2% wt, preferably $2\times10^{-4}$ to 0.2% wt and more preferably $2\times10^{-3}$ to 0.2% wt.

The concentration of the anionic polymer in the composition may be higher than that required to achieve consolidation as the polymer may be provided in concentrated form. Typically, however, the anionic polymer will be present in the composition at a concentration of $2\times10^{-5}$ to 2% wt, preferably $2\times10^{-4}$ to 0.2% wt and more preferably $2\times10^{-3}$ to 0.2% wt.

The concentration of the non-ionic polymer in the composition may be higher than that required to achieve consolidation as the polymer may be provided in concentrated form. Typically, however, the non-ionic polymer will be present in the composition at a concentration of $2\times10^{-5}$ to 2% wt, preferably $2\times10^{-4}$ to 0.2% wt and more preferably $2\times10^{-3}$ to 0.2% wt.

Each composition may also contain other additives known in the art for use in subterranean formation treatment. Such additives include surfactants, thickeners, diversion agents, corrosion inhibitors, scale inhibitors, pH buffers, fracture fluids, proppants, and pH buffers. Particularly preferably, however, each composition consists essentially of, and still more preferably consists of, one or more polymers as hereinbefore described.

Furthermore the present invention also relates to a kit comprising:
a cationic polymer in a first container; and
an anionic polymer and/or a non-ionic polymer in a second container.

Preferred kits comprise various salts in a third container. The salts may be mixed on site with sea water to form an aqueous carrier. Further preferred kits comprise instructions for mixing each of the polymers and the aqueous carrier.

Preferred cationic polymer present in the kit is as hereinbefore described in relation to the method. Preferred anionic polymer present in the kit is as hereinbefore described in relation to the method. Preferred non-ionic polymer present in the kit is as hereinbefore described in relation to the method. Preferably each of the cationic, anionic and/or non-ionic polymers is present in the kit in granular form. Preferred liquid carrier present in the kit is as hereinbefore described in relation to the method. Further preferred features of the kit (e.g. concentration of polymers, other additives present) are as described above in relation to the method.

Each kit may also contain other additives known in the art for use in subterranean formation treatment. The other additives may be present in the first, second, and/or when present, third container. Such additives include surfactants, thickeners, diversion agents, corrosion inhibitors, scale inhibitors, pH buffers, fracture fluids, proppants, and pH buffers. Particularly preferably, however, each kit consists essentially of, and still more preferably consists of, one or more polymers as hereinbefore described and an aqueous carrier.

The present invention also relates to the use of a composition and a kit as hereinbefore described to consolidate a subterranean formation comprising particles including but not limited to sand, clay and mica particles.

The amount of each polymer/composition to achieve particle consolidation will vary widely depending on factors such as the exact polymers used, the nature of the formation (e.g. the level of unconsolidation), the type of production occurring in the formation, the life time stage of the well, and so on. The appropriate amount of composition/carriers and therefore polymers will be readily determined by those skilled in the art.

Although the method of the invention may be carried out on a subterranean formation without any pre-flush, it is preferred to treat the formation with a pre-flush composition prior to treatment with the polymers described herein. The purpose of the pre-flush may be, for example, to wet the surface of the formation (e.g. if the formation is oil-rich) to aid retention of the polymers described herein. The pre-flush composition may therefore include a surfactant. An after-flush or over-flush composition may also be optionally used in the method of the invention. An after-flush serves to displace any polymer which has not absorbed onto the surface of the formation out of the well bore. Any convenient aqueous or non-aqueous, preferably aqueous, liquid may be used. Often an after-flush is not required as the polymers described herein strongly adhere to the particles.

Preferably the method of the invention does not significantly impact on the permeability of the formation. Thus preferably the permeability of the subterranean formation is substantially unchanged as a result of treatment according to the present invention. Preferably the permeability of the formation, and particularly the oil permeability of the formation, is 50-100%, more preferably 80 to 100% and still more preferably 90-100% of the permeability of the formation prior to treatment.

The present invention also relates to method of producing hydrocarbon from an unconsolidated subterranean formation comprising:
(i) consolidating said formation by a method as hereinbefore defined; and
(ii) producing hydrocarbon from said formation.

Preferably the particle production rate, e.g. sand particle production rate, is reduced after consolidation is carried out. Thus preferably the particle production rate, after consolidation is carried out, is lower than prior to the consolidation treatment herein described.

The treatment method of the present invention may be applied to a subterranean formation at any stage, e.g. before and/or after hydrocarbon production. Thus the polymers hereinbefore described may be used in treating a subterranean formation both prior to and after production of particles. In the former case, particle production may be prevented or minimised and the need for complex protection systems, e.g. sand protection systems, for completion of the well avoided. For instance, it may be possible to simply employ particle screens and avoid the need for a gravel pack. In the latter case, the method of the invention may effectively prolong the lifetime of a hydrocarbon producing formation. For existing wells where production is restricted by its Maximum Sand Free rate, treatment in accordance with the invention may enable the use of much higher flow rate.

Treatment times or period of shut-in following application of the polymers will depend on a number of factors including the nature of the formation and the degree of consolidation required, the nature and concentration of the polymers employed, the depth of perforations, etc. Typical shut-in times may be determined by those skilled in the art and will generally range from 2 to 24 hours, and more preferably from 2 to 12 hours, e.g. about 4 to 6 hours.

Any conventional treatment methods may be used to supply the polymers to the production well. Such methods will include bull-heading, coil tubing and zonal isolation with packers. Of these methods, bull-heading will generally be preferred. Suitable injection flow rates may be readily determined by those skilled in the art. Coiled tubing (CT) may also be successfully used to supply the polymers to the well. Such methods are generally more appropriate for treating long horizontal sections of a well. Suitable CT methods include those conventionally used in the field, e.g. roto pulse method, concentric coiled tubing, etc.

Treatment according to the method of the invention may also be repeated as many times as necessary.

Other conventional well treatments such as stimulation treatment, hydraulic fracture treatment and scale reduction treatment may be used in conjunction with the method of the invention. These may precede or follow the method of the invention. Preferably, however, the hydrocarbon producing system is ready to be put back onto production immediately after the method of the invention.

Figure 1:
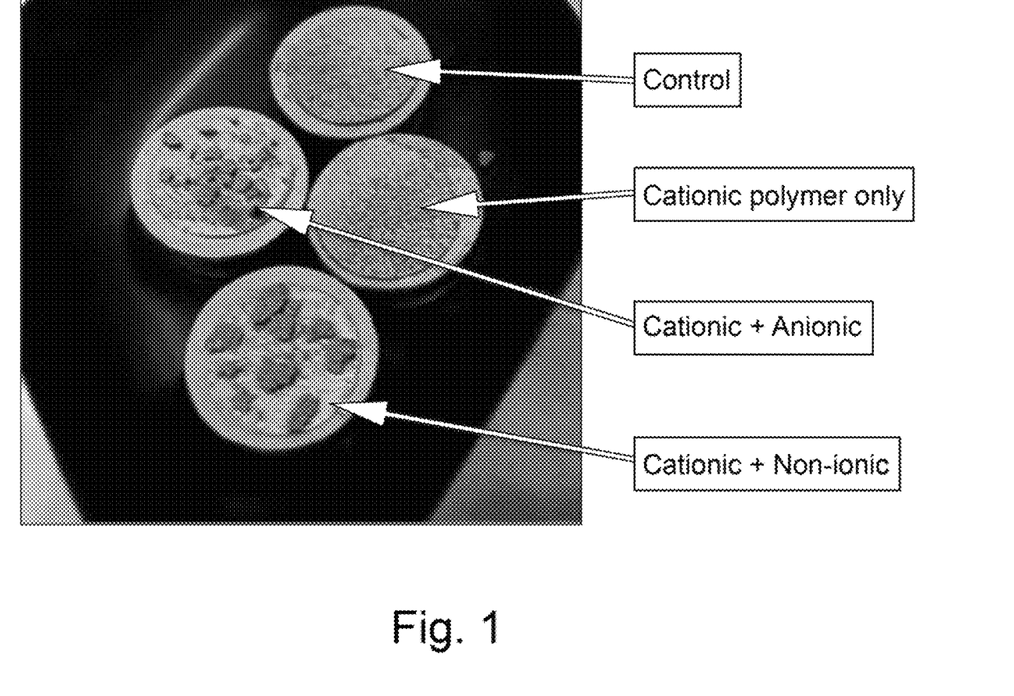
FIG. 1 is a photograph of gold coated sand, gold coated sand treated solely with a cationic polymer and gold coated sand treated by a method of the present invention.
Figure 2A:
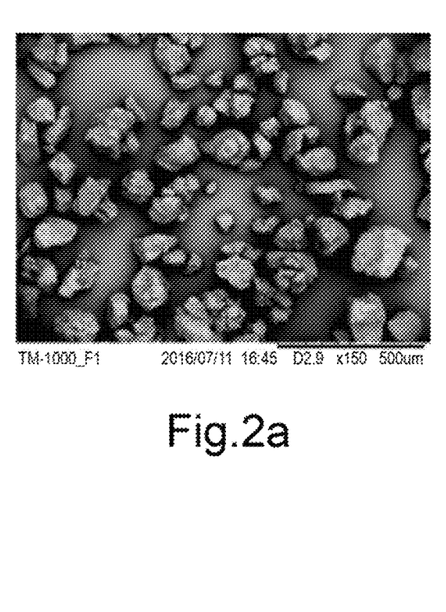
FIG. 2 is SEM images (×150 magnification) of gold coated sand (FIG. 2a), gold coated sand treated solely with a cationic polymer (FIG. 2b) and gold coated sand treated by a method of the present invention (FIG. 2c)
Figure 2B:
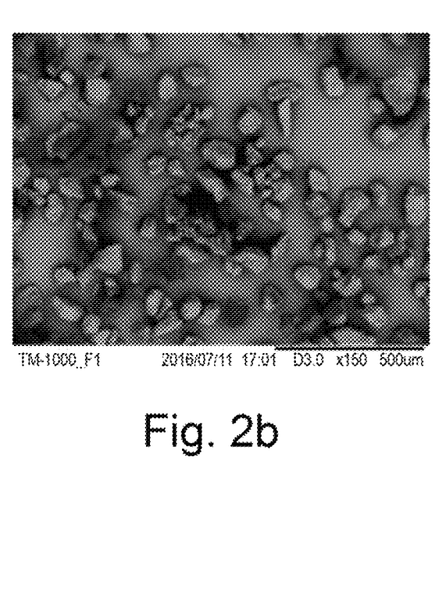
Figure 2C:
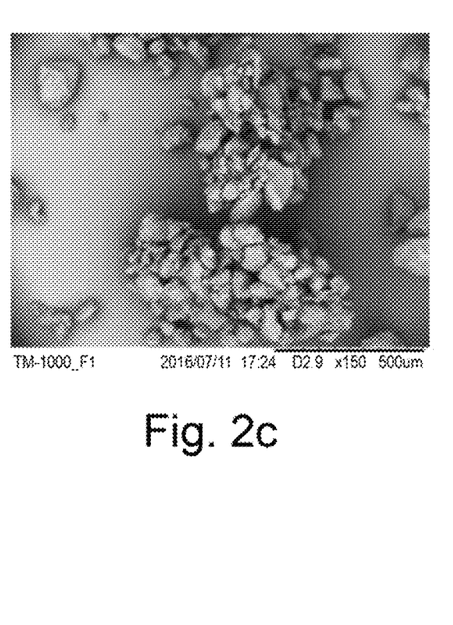
Figure 3:
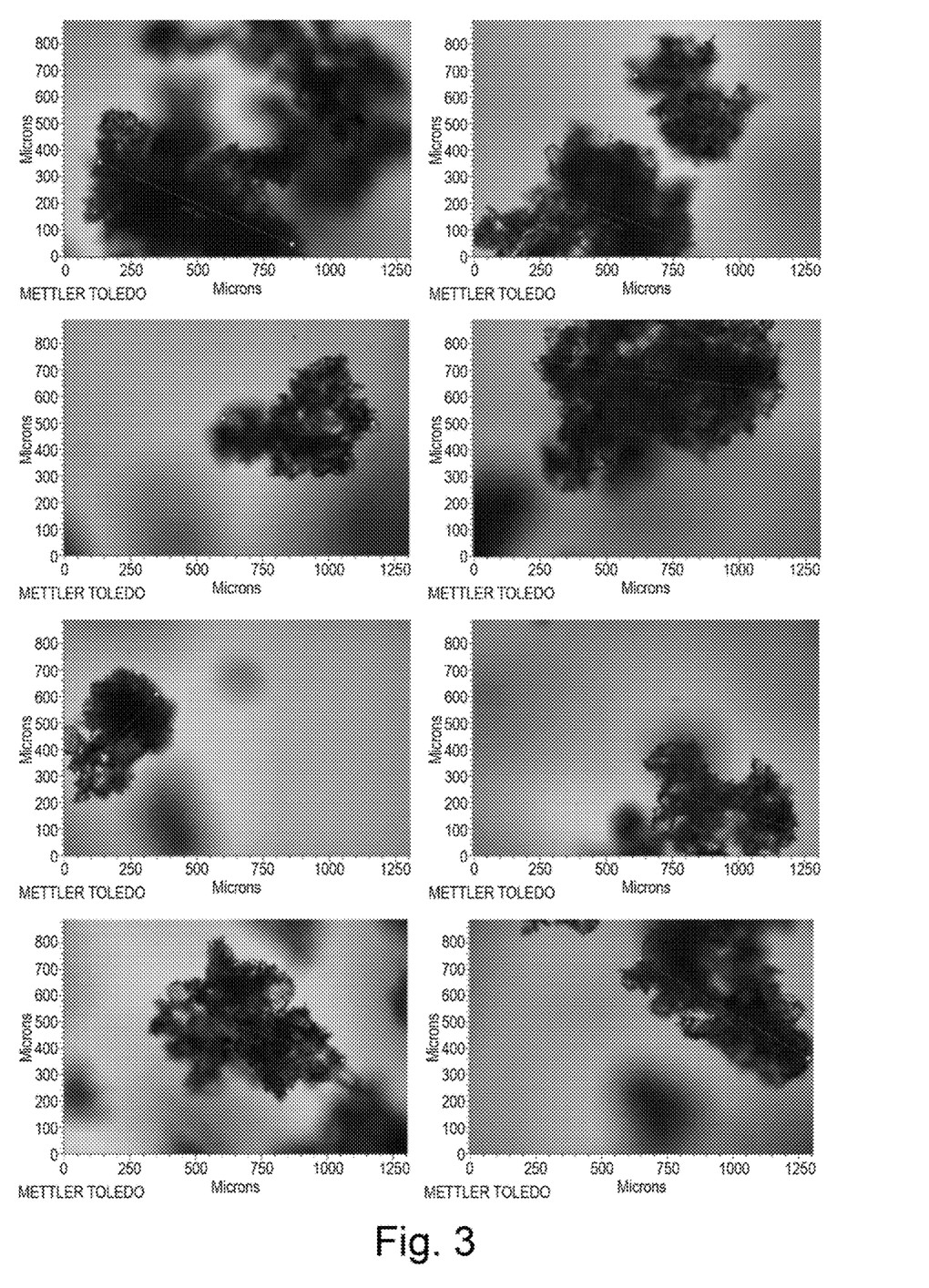
FIG. 3 is ParticleView Measurement (PVM) probe software images of agglomerates formed using the method of the invention.
Figure 4:
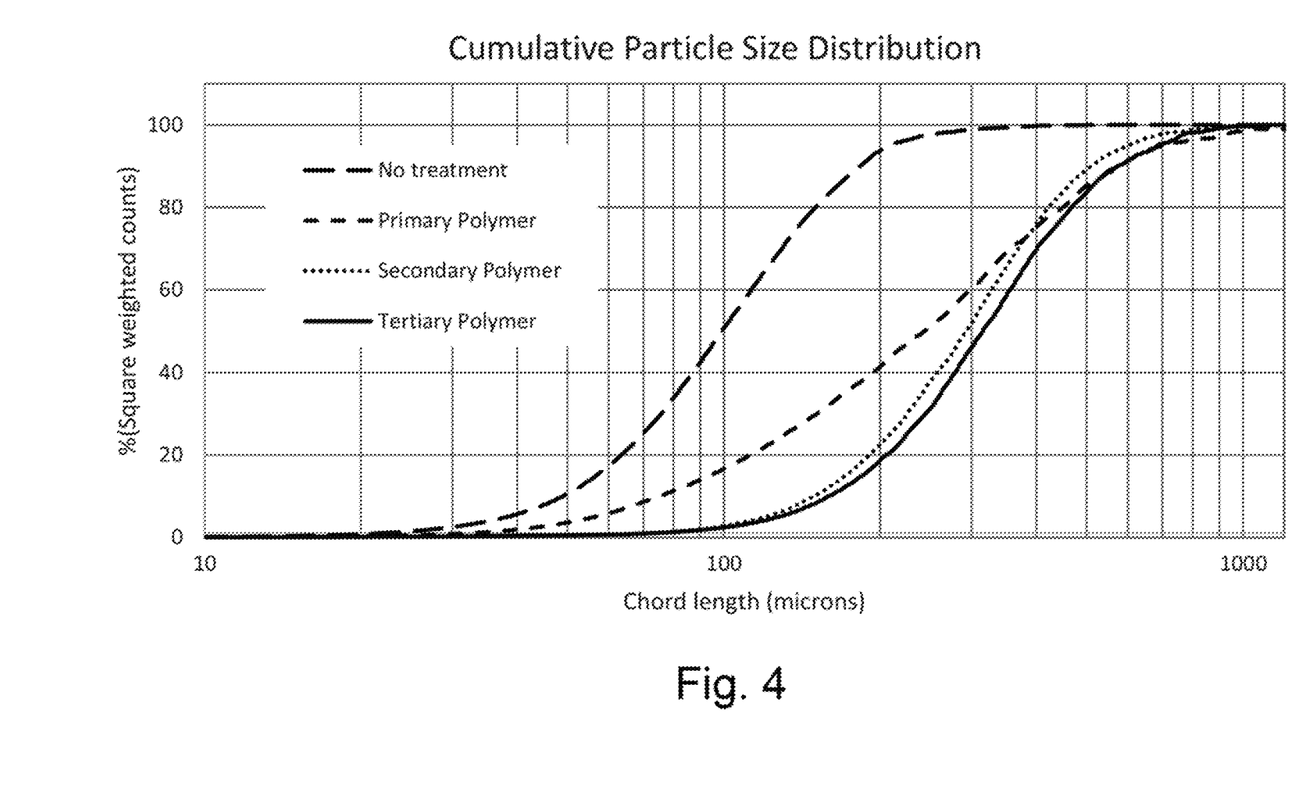
FIG. 4 is a plot showing cumulative particle size distribution achieved using the method of the invention compared to a reference sample.

The invention will now be described with reference to the following non-limiting Figures and examples, wherein:

FIG. 1 is a photograph of gold coated sand, gold coated sand treated solely with a cationic polymer and gold coated sand treated by a method of the present invention;

FIG. 2 is SEM images (×150 magnification) of gold coated sand (FIG. 2a), gold coated sand treated solely with a cationic polymer (FIG. 2b) and gold coated sand treated by a method of the present invention (FIG. 2c);

FIG. 3 is ParticleView Measurement (PVM) probe software images of agglomerates formed using the method of the invention; and FIG. 4 is a plot showing cumulative particle size distribution achieved using the method of the invention compared to a reference sample.

EXAMPLES

The examples were performed using the following materials and equipment, unless otherwise stated:
Standard brine consisting of NaCl, $Na_2SO_4$, $NaHCO_3$, $SrCl_2$, $BaCl_2$, KCl, $MgCl_2$ and $CaCl_2$ in deionised water
Chemicals: The following polymers were used:
cationic polymer: polymer comprising acrylamide and 2-(trimethylammonio)ethyl acrylate salt
anionic polymer: polymer comprising acrylamide and acrylic acid monomers
non-ionic polymer: acrylamide polymer
All polymers are acrylamide based and were obtained commercially.
Rock substrate: The core material used was sand from an oil field.
Scanning Electron Microscope (SEM) analysis: A Hitachi TM-1000 scanning electron microscope (in its default settings) was used to visually inspect the effect of the method of the invention on sand particles. A sample of sand particles (either untreated (control), treated solely with cationic polymer (control) or treated by a method of the invention) was sputter coated with a thin film of gold. The coated samples were placed on the SEM stage and slotted into the vacuum chamber. The chamber was evacuated of air using a vacuum pump, and a beam of electrons targeted at the coated surface of the sand particles. The backscattered electrons were detected by electron detectors, and processed to afford visual representations of the specimen surface. The magnification used is indicated on the images.
SEM Analysis of Sand Particles Treated by the Method of the Present Invention Sand samples were prepared in test tubes by adding polymers to a suspension of 0.6 g formation sand in 10 ml brine. Visual analysis of sand samples treated with the polymers as summarised in table 1 below was carried out using SEM analysis. The samples were prepared by adding a cationic polymer to a sand suspension, shaking the suspension for 5 minutes, followed by addition of the anionic or non-ionic polymer and shaking for a further 5 minutes. A sand sample, without any additional polymers, was used as a control. A sand sample, treated only with cationic polymer, was used as a further control. The sand samples were filtered and dried. The samples were dried in a 50° C. oven overnight with a towel to absorb the excess brine to prevent crystallisation.

Each of the treated samples was sputter coated with gold and analysed by SEM.

TABLE 1

| Example | Cationic polymer (ppm wt) | Anionic polymer (ppm wt) | Non-ionic polymer (ppm wt) |
| --- | --- | --- | --- |
| 1 | 2000 | 2000 | None |
| 2 | 2000 | None | 2000 |
| Comparative Example 1 | None | None | None |
| Comparative Example 2 | 2000 | None | None |

The results are shown in FIGS. 1 and 2. FIG. 1 is a picture of the gold coated samples. This image shows that there is very little difference between the untreated control sample and the control sample treated only with cationic polymer. In contrast, the sand samples treated by the method of the invention, are remarkably different to the control samples and comprise much larger particles.

This is confirmed in FIG. 2 which is the SEM images obtained with 150× magnification. Even under magnification, it is difficult to observe any differences between the sand particles which are untreated (FIG. 2a) and the sand particles treated solely with cationic polymer (FIG. 2b). In contrast it is clear from the 150× images that the sand particles treated by the method of the invention (FIG. 2c) undergo significant agglomeration and as a result comprise particles having a much larger average diameter size compared to the comparative samples. Additionally there are noticeably fewer smaller particles in the sand sample treated according to the method of the invention (FIG. 2c) compared to the comparative samples (FIGS. 2a and 2b).

Simulation of Reservoir Conditions

To study sand agglomeration under simulated reservoir conditions, a shear test rig was built based on a round bottomed vessel which was stirred at speeds just enough to keep the solids suspended. A Focused Beam Reflectance Measurement (FBRM) probe and a ParticleView Measurement (PVM) probe made by Mettler Toledo were each positioned in the vessel to measure changes in particle size distribution and collect images at various stages of the agglomeration process. Formation brine was used as the suspending medium and elevated temperatures up to 80° C. were used. The FBRM and PVM software were setup to collect data from the start until the end of the experiments. The formulation was introduced and changes were recorded after the introduction of each polymer (cationic polymer followed by anionic polymer followed by further cationic polymer). As a comparative, measurements were made with no treatment.

FIG. 3 shows images from the PVM probe software of the agglomerates formed during the experiment. The images show the agglomerates formed by treatment according to the invention. The particle sizes in the images range from 500 to 900 μm.

FIG. 4 shows the FBRM cumulative particle size distribution following the addition of cationic polymer (primary polymer), followed by anionic polymer (secondary polymer) and then further cationic polymer (tertiary polymer). This shows that the particle size distribution increases in size after each polymer treatment.

The invention claimed is:

1. A method of consolidating a subterranean formation which comprises particles, wherein said particles are the same as those which form the structure of the formation and/or fines present within the structure of the formation, said method comprising:
(i) selecting a subterranean formation in need of consolidation;
(ii) contacting said particles with a cationic polymer; and then
(iii) contacting said particles with an anionic polymer and/or a non-ionic polymer to agglomerate said particles and thereby consolidate said formation, wherein said agglomeration increases the uniformity of the size of said particles, the agglomerated particles comprise an average diameter of 250-2500 pm, and
wherein said cationic polymer is formed from monomers of formula (I):

wherein
$R^1$ is H, $CH_3$;
$R^2$ is COY, $C_{6-12}$ aryl or $C_{3-12}$ heteroaryl;
Y is OR or $NR_2$; and
each R is independently selected from H and $C_{1-6}$ alkyl; and/or
said cationic polymer is formed from monomers of formula (II):

(II)

wherein $R^1$ is H or $CH_3$ and A is $C_{3-12}$ heteroaryl group; and/or
wherein said cationic polymer is formed from monomers of formula (III):

(III)

wherein
$R^1$ is H or $CH_3$;
Y is OR or $NR_2$; and
each R is independently selected from H and $C_{1-6}$ alkyl; and/or
wherein said cationic polymer is formed from monomers of formula (IV):

(IVa)

(IVb)

wherein
$R^1$ is H or $CH_3$;
$Y^1$ is O or NH;
m is an integer from 1 to 6, preferably 2 or 3;
each $R^2$ is independently H or $C_{1-6}$ alkyl, preferably each $R^2$ is methyl; and
X— is a counter anion.

2. A method as claimed in claim 1, wherein said agglomeration increases the average diameter of said particles.

3. A method as claimed in claim 1, wherein said particles are sand particles.

4. A method as claimed in claim 1, wherein said cationic polymer is a copolymer.

5. A method as claimed in claim 1, wherein said cationic polymer is formed from monomers selected from 2-(trimethylammonio)ethyl acrylate salt, 2-(trimethylammonio) ethyl methacrylate salt, 2-(triethylammonio)ethyl acrylate salt, 2-(triethylammonio)ethyl methacrylate salt, acrylamide propyltrimethylammonium salt, methacrylamide propyltrimethylammonium salt, acrylamide propyltriethylammonium salt, methacrylamide propyltriethylammonium salt, dimethyldiallyl ammonium chloride, 2-vinylpyridine salt, 4-vinylpyridine salt and 3-methyl-1-vinyl-1H-imidazole salt.

6. A method as claimed in claim 1, wherein said cationic polymer is formed from acrylamide and 2-(trimethylammonio)ethyl acrylate salt.

7. A method as claimed in claim 1, wherein said cationic polymer has a weight average molecular weight of $1 \times 10^5$ to $20 \times 10^6$ g/mol; and/or said cationic polymer has a charge activity of 5 to 100 mol %.

8. A method as claimed in claim 1, wherein said anionic polymer is a copolymer.

9. A method as claimed in claim 1, wherein said anionic polymer is formed from monomers of formula (III):

(III)

wherein
$R^1$ is H or $CH_3$;
Y is OR or $NR_2$, and
each R is independently selected from H and $C_{1-6}$ alkyl; and/or
wherein said anionic polymer is formed from monomers of formula (VI):

(VI)

wherein
$R^1$ is H or $CH_3$; and
$R^3$ is $CO_2Z$, $SO_3Z$, $PO_3Z_2$, $(CH_2)_{1-6}CO_2Z$, $(CH_2)_{1-6}SO_3Z$, $(CH_2)_{1-6}PO_3Z_2$, $CONH(CR)_2CO_2Z$, $CONH(CR)_2SO_3Z$, $CONH(CR)_2PO_3Z_2$, wherein R is H, $CH_3$ or $C_2H_5$ and Z is H or a univalent metal atom.

10. A method as claimed in claim 9, wherein in formula (VI) $R^3$ is $CO_2Z$.

11. A method as claimed in claim 1, wherein said anionic polymer has a weight average molecular weight of $1 \times 10^5$ to $40 \times 10^6$ g/mol; and/or said anionic polymer has a charge activity of 10-100 mol %.

12. A method as claimed in claim 1, wherein said nonionic polymer comprises a homopolymer.

13. A method as claimed in claim 1, wherein said non-ionic polymer comprises monomers of formula (III):

(III)

wherein
R$^1$ is H or CH$_3$; and
Y is OR or NR$_2$,
wherein when Y is OR, R is independently selected from C$_{1-6}$ alkyl and when Y is NR$_2$ each R is independently selected from H and C$_{1-6}$ alkyl, preferably wherein Y is NR$_2$ and each R is H.

14. A method as claimed in claim 13, wherein said non-ionic polymer has a weight average molecular weight of 1×10$^5$ to 40×10$^6$ g/mol.

15. A method as claimed in claim 1, wherein in step (ii) an anionic polymer is added.

16. A method as claimed in claim 1, wherein in step (ii) a non-ionic polymer is added.

17. A method as claimed in claim 1, wherein said cationic polymer, said anionic polymer and said non-ionic polymer are each provided as a solution or suspension in an aqueous carrier.

18. A method of producing hydrocarbon from an unconsolidated subterranean formation comprising:
   (i) consolidating said formation by a method as defined in claim 1; and
   (ii) producing hydrocarbon from said formation.

19. A method as claimed in claim 18, wherein the particle production rate (e.g. sand particle production rate) is reduced after consolidation is carried out.

20. A method as claimed in claim 1, wherein the agglomeration increases the average diameter of particles present in the formation by 200-2000%.

\* \* \* \* \*